April 20, 1926.

P. A. DEL VALLE

ANTISKID DEVICE

Filed Feb. 4, 1925

1,581,722

Inventor
P.A. del Valle
By Bacon & Thomas
Attorneys

Patented Apr. 20, 1926.

1,581,722

UNITED STATES PATENT OFFICE.

PEDRO A. DEL VALLE, OF ANNAPOLIS, MARYLAND.

ANTISKID DEVICE.

Application filed February 4, 1925. Serial No. 6,749.

*To all whom it may concern:*

Be it known that I, PEDRO A. DEL VALLE, a citizen of the United States, residing at Annapolis, in the county of Anne Arundel and State of Maryland, have invented certain new and useful Improvements in Antiskid Devices, of which the following is a specification.

My invention relates to improvements in anti-skid devices for automobile tires, and it is more particularly my purpose to incorporate in the cross chains of the well-known Weed type of anti-skid chain a comparatively large link so positioned with respect to the tire, when the chain is placed thereon, that additional tractive surface is provided at the tread portion. It is further my object to provide such a link so constructed that when the wheel to which the chain is attached runs into deep mud or snow, the link will, due to its peculiar formation, present a comparatively large tractive surface at the sides of the tire, thereby materially assisting the driving out of mud holes or deep snow to which the common form of skid chain would offer insufficient resistance.

It is also my intention to provide a link such as that outlined above that can be readily incorporated as a part of the anti-skid chain or easily detached therefrom when necessity requires, thereby providing such a device that can be purchased separately from the chain proper, and easily and quickly attached thereto so as to become, for all practical purposes, a permanent part thereof. Also my link is of such a character that the same will outlast for a long period of time the ordinary chain, and therefore when the cross chain links become worn and must necessarily be discarded, my improved link can be quite easily detached, retained, and incorporated in another cross chain and so be used for an indefinitely long period as compared with the cross chain links of the anti-skid chain per se.

Further my invention is to provide such a link that will be very durable yet comparatively inexpensive to manufacture and one that will require no additional links or connecting members to attach the same to the skid chain.

With the above objects in view I will now proceed to describe my invention with reference to the accompanying drawings which show the preferred form of my anti-skid device and in which, Figure 1 is a side view of a section of a tire and wheel with my anti-skid device attached thereto.

Figure 1:
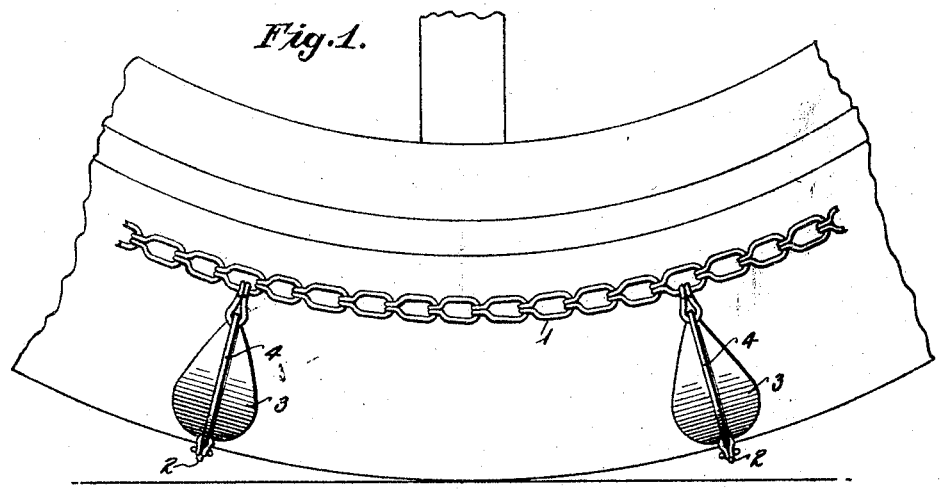
Figure 2:
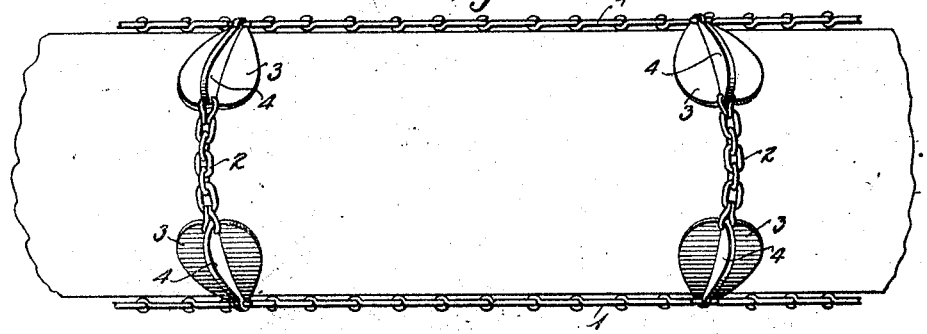
Figure 2 is a top view of a section of a tire with the anti-skid device attached thereto.
Figure 3:
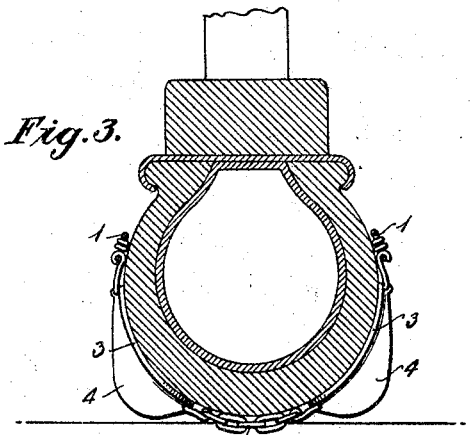
Figure 3 is a sectional view of a tire with the device positioned thereon.

In the drawings, 1 represents the usual side chains of the well-known type of anti-skid chain and 2 are the usual cross chains. At 3 is represented my improved link which is preferably formed or stamped from sheet metal and is substantially V-shaped or triangular of gradually decreasing width as shown from the portion adapted to lie adjacent the tread of the tire to that portion adapted to lie adjacent the rim of the wheel.

This link is formed substantially flat with its base or under face concaved so as to fit snugly against the contour of the sides of the tire. Numeral 4 represents a fin extending the full length of the link and preferably gradually decreasing in height from the top, or that portion lying adjacent the top to the apex, or that portion lying adjacent the side chains. It is obvious that I may provide a plurality of such fins or ridges in lieu of the single fin shown.

The above described link may be attached to the cross chains and side chains by the ordinary chain links such as are commonly used to attach said cross chains to the side chains whereby my improved link can be detached from the chain assemblage by merely opening the attaching link as is ordinarily done. Obviously, however, any suitable means can be used to securely attach my link in place to the chain assemblage.

It will thus be seen that I have provided a device such as described that will give increased protection against skidding, also greatly assist in driving out of deep mud and snow. Inasmuch as the fins or portions 4 of the link form the greatly increased tractive surface, the deeper the wheel sinks into the mud or snow, the greater will be the tractive surface due to the gradually increasing height of the fin. It will also be observed that the bearing portions of the chains are greatly strengthened by the insertion of my two strong links on each side of the cross chains.

It is also to be noted that the formation of my improved link greatly obviates, to a large extent, the noise and rattle commonly occasioned by the links striking against mud guards, etc., on hard roads, inasmuch as my improved link, located on each side of the tire, tends to balance the cross chains and prevents the same from being flung against the mud guards by centrifugal force to a large extent when there is no great amount of tractive force exerted on the cross chains.

Having thus described my invention, what I claim is:

1. A combined anti-skid and traction increasing link formed of a single piece of metal of substantially triangular shape and curved longitudinally to conform to the sides of a vehicle tire and having an outwardly projecting longitudinal traction increasing fin whose height gradually decreases from the base to the apex of the link, the apex of the link being adapted to lie adjacent the side chains.

2. A combined anti-skid and traction increasing link formed of a single piece of metal of substantially triangular shape and curved longitudinally to conform to the sides of a vehicle tire and having an outwardly projecting longitudinal traction increasing fin whose height gradually decreases from the base of the apex of the link, means for attaching the link to the cross chains and side chains of an anti-skid chain, said link being of such length as to extend from a point adjacent the side chains to the tread of a tire with the apex of the link lying adjacent the side chains.

In testimony whereof I affix my signature.

PEDRO A. DEL VALLE.